United States Patent [19]
Uehara et al.

[11] Patent Number: 5,929,388
[45] Date of Patent: Jul. 27, 1999

[54] VEHICLE LOAD MEASURING APPARATUS AND METHOD

[75] Inventors: Kazuyasu Uehara, Tokyo; Hiroyuki Satoh, Yokohama, both of Japan

[73] Assignee: Mitsubishi Jidosha Kogyo Kabushiki Kaisha, Tokyo, Japan

[21] Appl. No.: 08/869,139

[22] Filed: Jun. 4, 1997

[30] Foreign Application Priority Data

Jun. 4, 1996 [JP] Japan ................................ 8-163907

[51] Int. Cl.⁶ .................................................. G01G 19/08
[52] U.S. Cl. ........................................... 177/136; 701/50
[58] Field of Search .................................. 177/136, 141; 701/50; 702/174

[56] References Cited

U.S. PATENT DOCUMENTS

| | | | |
|---|---|---|---|
| 4,630,227 | 12/1986 | Hagenbuch | 177/136 |
| 4,673,047 | 6/1987 | Harbor | 177/136 |
| 4,839,835 | 6/1989 | Hagenbuch | 177/136 |
| 4,845,648 | 7/1989 | Hagenbuch | 177/136 |
| 4,941,365 | 7/1990 | Reiner et al. | 177/136 |
| 5,161,628 | 11/1992 | Wirth | 177/137 |
| 5,215,154 | 6/1993 | Kirby | 177/136 |
| 5,410,109 | 4/1995 | Tarter et al. | 177/136 |
| 5,650,930 | 7/1997 | Hagenbuch | 177/141 |
| 5,817,989 | 10/1998 | Shimizu et al. | 177/136 |
| 5,831,343 | 11/1998 | Nakazaki | 177/136 |

*Primary Examiner*—Randy W. Gibson

[57] ABSTRACT

A vehicle load measuring apparatus capable of eliminating errors caused by an accelerating force at the time of starting the vehicle or by an inertial force at the time of stopping the vehicle, and to obtain an accurate, stable and reliable load information of a loadage on the vehicle and a total weight of the vehicle. The apparatus operates such that, at the time of starting the vehicle, when the starting condition is detected based on a vehicle speed signal, the load information stored a predetermined time prior to the detection of the starting condition is utilized as a formal load data. At the time of stopping the vehicle, a stopped condition is detected based on the vehicle speed signal and also whether the brake is in the applied condition or not is determined. When the brake is not being applied, the load information at that point of time is used as the formal load data, and when the brake is still being applied, the load information is obtained after an elapsing of a predetermined period of time.

17 Claims, 7 Drawing Sheets

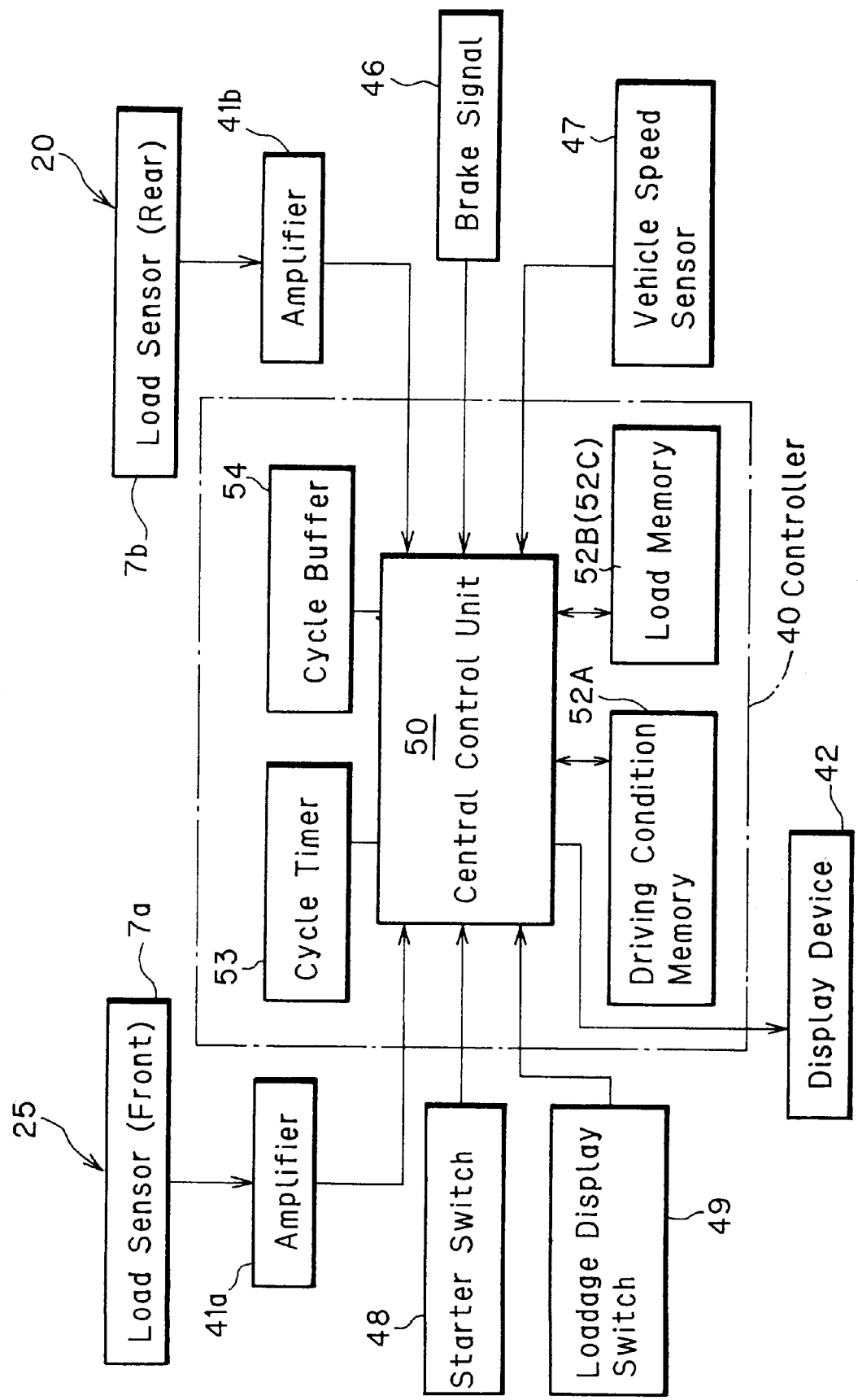

CYCLE BUFFER

Fig.4

| | | Vehicle Posture |
|---|---|---|
| (a) | Starting Time | 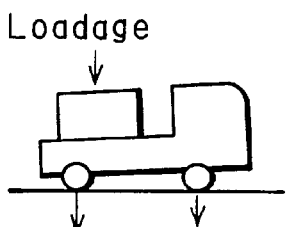<br>Loadage<br>Increase of the load on the rear axle |
| (b) | While the vehicle is running | 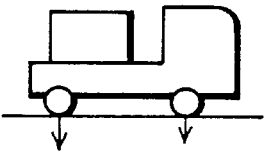<br>Loads on the front and rear axles are always fluctuating |
| (c) | At the time of stopping the vehicle (in the state of the brake being applied) | 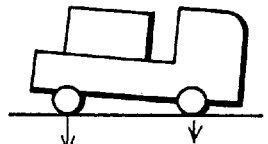<br>The load on the front axle is increased |
| (d) | At the time of stopping the vehicle (upon releasing of the brake) | 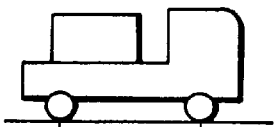<br>The load returns to the state of before starting the vehicle |

VEHICLE LOAD MEASURING APPARATUS AND METHOD

FIELD OF THE INVENTION

This invention relates to a vehicle load measuring apparatus for measuring a loadage and a total weight of a vehicle, such as trucks, by adding a vehicle weight to the loadage, and specifically to a vehicle load measuring apparatus in which load sensors are disposed in proper positions of components of the vehicle to detect the load of the vehicle, thereby measuring the loadage and the total weight of the vehicle.

BACKGROUND OF THE INVENTION

Recently, in order to prevent an excess loading on large vehicles, such as trucks, it has been proposed to incorporate a load measuring apparatus directly in the vehicle body to enable a driver or loading people to easily determine a loadage.

For example, as shown in FIGS. 5 and 6, there is a vehicle load measuring apparatus in a large vehicle having a suspension structure consisting of leaf springs 26a and 26b, wherein load sensors 7a, 7b of a magnetostrictive type distortion sensor or distortion sensor are attached to members which receive a load given by a weight of loaded goods. More specifically, at the side of a front wheel 25, the sensor is attached to a shackle pin 34, which connects a bracket 31 and a shackle 32; and, at the side of a rear wheel 20, the sensor is attached to a trunnion shaft 3, which is supported by a trunnion bracket 2, so that loads applied to these members can be detected, thereby measuring the loadage and/or the vehicle weight.

Specifically, as shown in FIGS. 5 and 6, the load at the side of the front wheel 25 is detected by the load sensor 7a in such a manner that an axial hole 6 is provided along an axial direction on a center line of the shackle pin 34 which connects the suspension (leaf spring) 26a of the vehicle and the bracket 31 on the side of a loading platform frame 1 through a bush 33, and a pair of sensors 7a is disposed in the axial hole 6, so as to detect distortion of the shackle pin 34 which is deformed by an amount in proportion to the load above the spring of the vehicle at the side of the front wheel 25.

On the other hand, the load at the side of the rear wheel 20 is detected by the load sensor 7b in such a manner that, as shown in FIGS. 5 and 7, the axial hole 6' is provided along an axial direction on a central line of a horizontal axis 3a of the trunnion shaft 3 engaged with the trunnion bracket 2 attached to the loading platform frame 1, and the load sensor 7b is disposed in the axial hole 6', thereby detecting distortion of the trunnion shaft 3 which is deformed by an amount in proportion to the load above the spring of the vehicle at the side of the rear wheel 20. Output signals respectively provided by the sensors 7a, 7b are amplified by amplifiers 41a, 41b to obtain the load above the springs of the vehicle. Then, arithmetic computation of adding a load below the spring of the vehicle is carried out by a controller 40, to measure the vehicle load and/or the loadage, and, if necessary, the measured value is displayed on a display device 42.

Specifically, the controller 40 performs a predetermined process based on the detected signals representing the vehicle load, a switching signal from each switch, which will be described hereinafter, and an input signal, such as, a signal representing a vehicle speed detected by a vehicle speed sensor, and sends the resulted signals representing the loadage and the total weight of the vehicle to the display device 42 provided in the driver's cabin. An accurate measurement, however, cannot be achieved in the foregoing system while the vehicle is running due to vibrations.

The above-described system has the following problems.

The vehicle speed signal is generated for example, at the time of starting the vehicle, when the vehicle speed becomes from zero (0) to a value grater than zero. The load data (the loadage and the total weight of the vehicle) is stored before starting of the vehicle. However, immediately before starting the vehicle, a minus accelerating force (a force to start) of a reaction force is produced, and the accelerating force acts upon the rear axle, thereby increasing load on the rear axle is increased, as shown in FIG. 4(a). Consequently, the load value being stored is increased up to a range of 1~2% depending on the condition of the loading.

Further, a similar problem is involved at the time of stopping the vehicle.

When stopping the vehicle, the driver steps on the brake, and when the vehicle speed becomes zero (0), the wheel tires come to a stop first. However, an inertial force due to the weight of the vehicle body and the loaded goods continues to advance forward. As a result, the load applied to the front axle is correspondingly increased as shown in FIG. 4(C).

In view of the above problems, the applicant of this application had considered a possibility of using load data after the lapse of a predetermined time of a few seconds after the vehicle speed has reached zero (0). However, in such measuring procedure, when the brake is continuously under the stepped-on condition, the axle is slightly distorted due to the inertial force of the vehicle body caused by holding the brake. If such a slight distortion of the axle is maintained, a reduced load is displayed. Such reduction of load is, for example, in the order of 4%.

Further, measuring of fluctuations in the loadage is made based on the load data stored immediately before starting of the vehicle or at the time of stopping the vehicle. Therefore, the above-described error values are accumulated every time when the vehicle is started or stopped by the brake action, and the eventual error will greatly exceed a predetermined range.

Thus, it is an object of the present invention to solve such problems of the prior art by providing a vehicle load measuring apparatus capable of eliminating the error caused by the above-described accelerating force at the time of starting the vehicle or the inertial force at the time of stopping the vehicle, so that an accurate and stable load data can be always stored or displayed.

SUMMARY OF THE INVENTION

To achieve the above object, a vehicle load measuring apparatus of the present invention comprises: load sensors (7a, 7b) attached to vehicle members, which receive a weight of a vehicle and outputting signals indicative of the weight;

a load information computing section (50) for arithmetically computing the load information based on the output signals from the load sensors (7a, 7b);

a load information memory section (52B) for storing the load information computed in the load information computing section (50);

load information control means (40) to output the stored load information; and vehicle posture information detection means (46,47) for detecting the vehicle posture information, and wherein, the load information control means (40) is adapted to up-date the data in the load information memory section (52B) when the vehicle posture detected by the vehicle posture information detection means (46, 47) is in a predetermined state. The vehicle posture information detection means comprises at least vehicle speed detection means (46) for detecting the vehicle speed.

With this arrangement, a stable and highly accurate load data with free of error can be always provided.

Here, the vehicle posture information detection means comprises braking action detection means (47) for detecting whether there is braking action or not, and the load information control means (40) determines whether the vehicle is in the stopped condition or not based on the signal detected by the vehicle speed detection means (46), and determines whether there is the braking action or not based on the signal detected by the braking action detection means (47). Then, the load information control means (40) may be so structured that, when it is determined that the vehicle is in the stopped condition, and the brake is not in the operated condition, the data of the load information memory section (52B) may be up-dated based on the load information which has been arithmetically computed in the load information computing section (50). Further, the load information control means (40) may also be structured such that, when it is determined that the vehicle is in the stopped condition, but the brake is still in the applied condition, the braking condition is checked again after the lapse of a predetermined period of time, and when the brake is determined to be no longer in the operated condition, the data of the load information memory section (52B) may be up-dated based on the load information which has been arithmetically computed in the load information computing section (50). Still further, it is possible to structure the load information control means (40) to include a temporary memory section (52C) for temporarily storing the load information which has been arithmetically computed in the load information computing section (50), and wherein, when it is determined that the vehicle is in the stopped condition but the brake is still in the applied condition, the load information which is arithmetically computed in the load information computing section (50) at that point can be stored in the temporary memory section (52C). In this case, the load information control means (40) may also be structured such that, when it is determined that the vehicle is in the stopped condition, but the brake is still in the applied condition, the temporary load information stored in the temporary memory section (52C) is compensated, a corrected load information is arithmetically computed, and the data of the load information memory section (52B) is up-dated based on the corrected load information. For this purpose, it is possible to have the load information memory section (52B) also serve as the temporary memory section (52C).

With the above-described structure, a stable and highly accurate load data with free of error can be always provided when the vehicle is in the stopped condition, despite changes in the load during unloading and regardless of whether there is still braking action or not.

Also, it is possible to arrange the load in formation control means (40) to include a buffer memory section (54) for arithmetically computing the load information in the load information computing section (50) at every first predetermined time, and storing a predetermined number of load information provisionally, and wherein whether the vehicle is in the stopped or starting condition is determined based on the signal detected by the vehicle speed detection means (46), and when the starting of vehicle subsequent to its stopped condition is detected, the load information stored in the buffer memory section (54) a second predetermined time prior to the detection of the starting condition is used for updating the data of the load information memory section (52B).

With this arrangement, a stable and highly accurate load data can be provided, from which the error, that might have been caused during starting of the vehicle, is eliminated.

Further, with such arrangement, display means (42) may be added for displaying the load information outputted from the load information control means (40), and the load information control means (40) may be arranged to also up-date the display of the display means (42) when the data in the load information memory section (52B) is up-dated.

BRIEF DESCRIPTION OF THE DRAWINGS

FIG. 1 is a block diagram of a vehicle load measuring apparatus according to an embodiment of this invention, FIG. 4 is a schematic view showing the state of change of the vehicle posture and change of the load on the front and rear axles.

DETAILED DESCRIPTION OF EMBODIMENT OF THE INVENTION

Now, an embodiment of the invention will be described by referring to the accompanying drawings.

However, it should be noted that dimensions, materials and shapes of components and their relative positions described herein are only illustrative of this invention and are not meant to limit the scope of the invention, unless otherwise specifically described.

Figure 6:
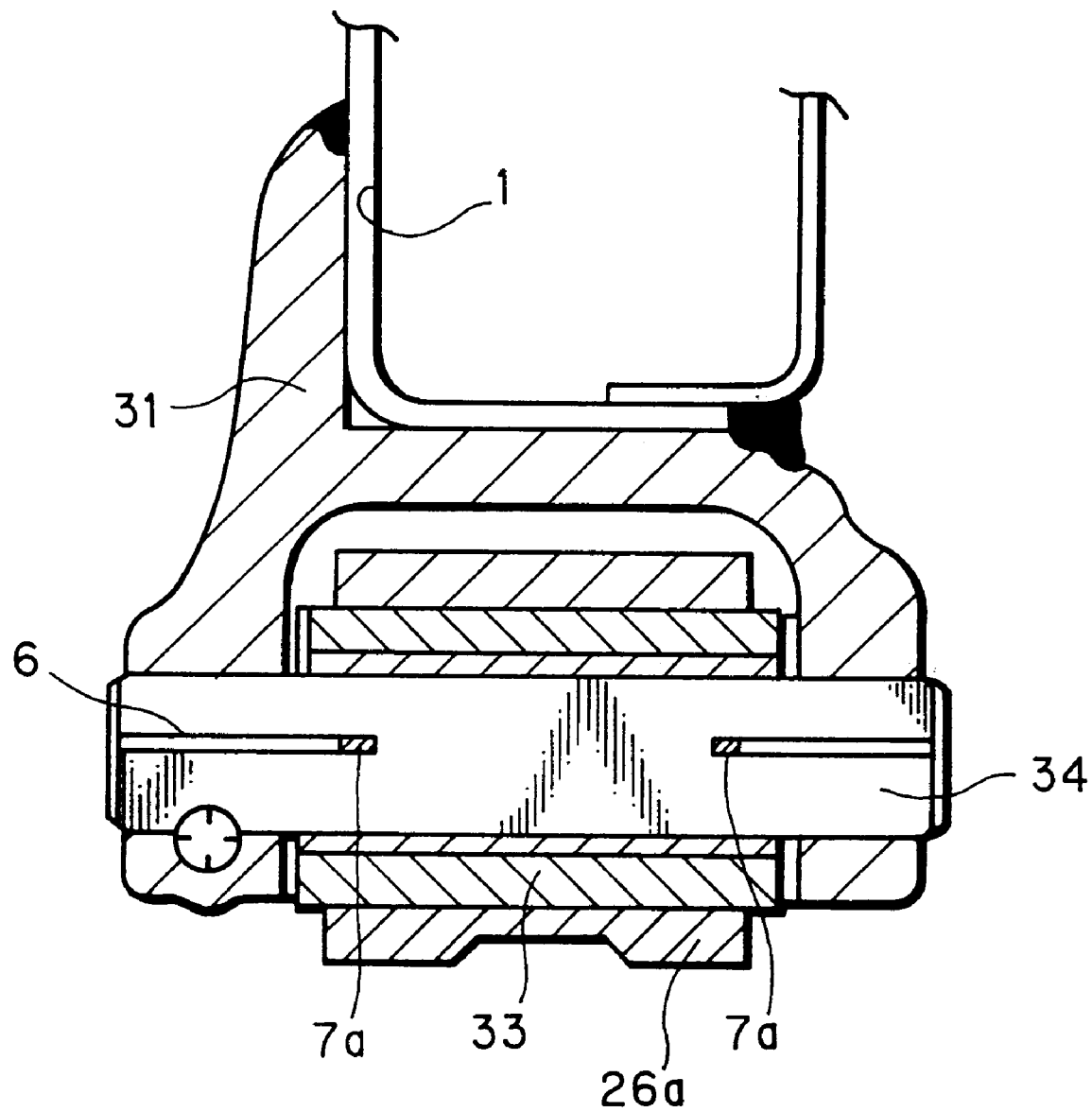
FIG. 6 is a sectional view showing the vicinity of the place where the load sensor for the front wheel side is attached in the vehicle of FIG. 5.
Figure 7:
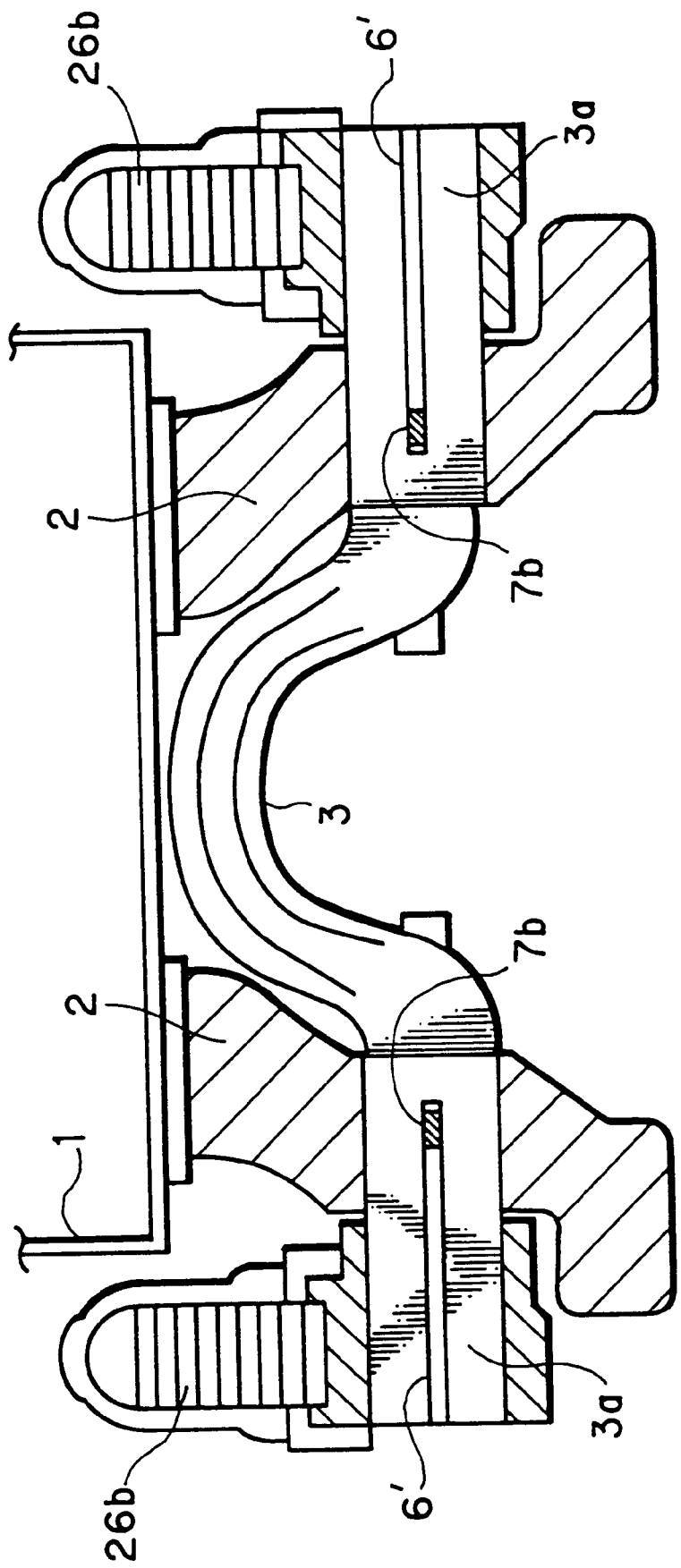
FIG. 7 is a sectional view showing the vicinity of the place where the load sensor for the rear wheel side is attached in the vehicle of FIG. 5.

FIG. 1 shows a block diagram of the vehicle load measuring apparatus as the embodiment of this invention. Numerals 7a, 7b designate load sensors comprising magnetostrictive sensors, and, as described above, the load sensor 7a for the front wheel side is inserted into an axial hole of a shackle pin 34, and the load sensor 7b for the rear wheel side is inserted into a horizontal axis of a trunnion shaft 3 as shown in FIGS. 6 and 7. Detected vehicle load signals from these sensors 7a, 7b are amplified and subjected to V/f conversion by amplifiers 41a, 41b to be input into a controller 40.

To the controller 40, various signals are input from, such as, a brake signal detection switch 46, a vehicle speed sensor 47, a starter switch 48 and a loadage display switch 49.

The starter switch 48, upon being turned-ON, functions to provide a trigger signal to the controller 40 to start measuring of the vehicle load, and various driving conditions of the vehicle.

The loadage display switch 49, upon being turned-ON, changes the display in a display device 42 to a loadage display, only when the vehicle speed signal from the vehicle speed sensor 47 is "0".

As described above, numeral 42 designates the display device for displaying the vehicle load including a loadage of the vehicle and a total weight of the vehicle, only when the vehicle speed signal is "0". When the vehicle speed signal is other than "0", namely, while the vehicle is running, the display can be switched for displaying information of various driving conditions of the vehicle, so as to function as a multi-display system.

The controller 40 comprises a central control unit 50 having a CPU, a driving condition memory 52A for receiving various sensor outputs and storing various driving conditions (various sensor outputs), and a load memory 52B for storing the vehicle load including the loadage on the vehicle and the total weight of the vehicle, the information of which has been arithmetically computed in the central control unit 50 upon its receiving of ON signal from the loadage display switch 49 and "0" signal from the vehicle speed sensor 47.

Figure 2A:
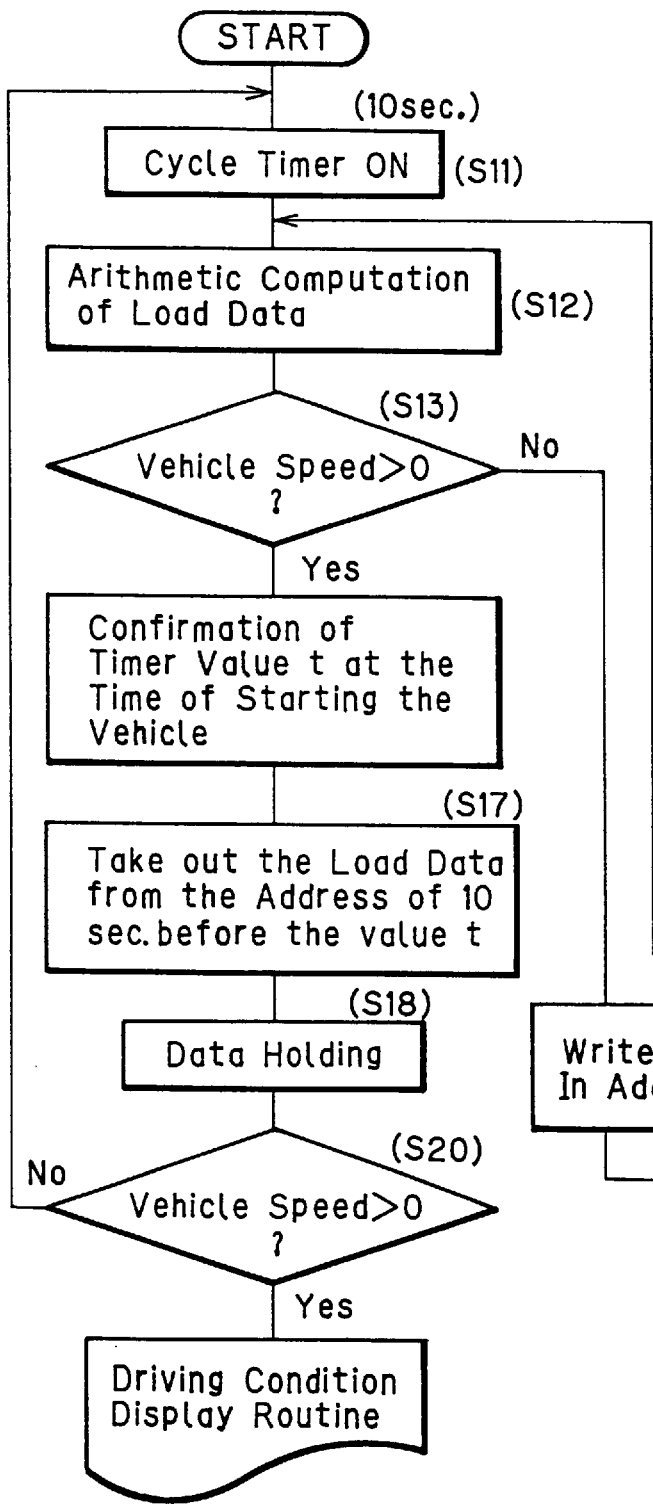
FIG. 2(A) is a flow chart showing an order of steps taken at the time of starting the vehicle.
Figure 2B:
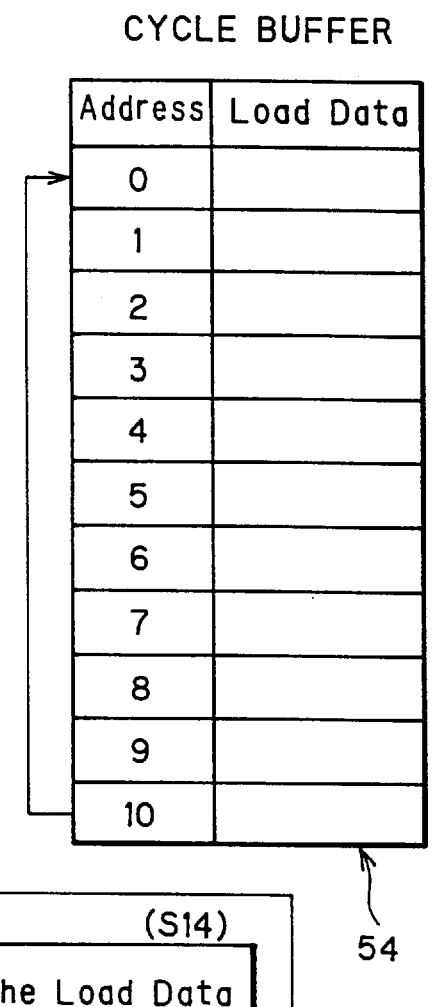
FIG. 2(B) is a cycle buffer used for the flow chart of FIG. 2(A)

The central control unit 50 has, in addition to the CPU, a cycle timer 53 for making a cycle of [0→1→2→ . . . 9→10 →0→1→ . . . ] between a period of 0~10 seconds, and a cycle buffer 54 for storing load data cyclically and repeatedly in each of addresses 0~10, as shown in FIG. 2(B), corresponding to the above-described timer values, respectively.

It should be noted that in the structure of the described embodiment, the load memory 52B also functions as a temporary storage area 52C for storing the load data temporarily, and the description hereinafter will be made by using only numeral 52B of the load memory.

Next, the order of steps to be taken in the disclosed embodiment will be described by referring to FIG. 2 and FIG. 3.

FIG. 2(A) is a flow chart showing the order of steps to be taken at the time of starting the vehicle. Upon turning-ON of the starter switch 48, the steps proceed to a load measuring routine as shown in FIG. 2.

Upon shifting to the load measuring routine, the cycle timer 53 is turned-ON first, and a cyclic counting is made repeatedly during a period of 0~10 seconds. (S11)

Subsequent to turning-ON of the cycle timer 53, sensor outputs are taken from the load sensors at a predetermined timing cycle, and the load data including the loadage and the total weight of the vehicle is arithmetically computed by a predetermined arithmetic computation. (S12)

The arithmetic computation timing cycle is preferably set to a range of 0.3~1.0 seconds in view of a load of the CPU.

Following the arithmetic computation, the steps proceed to determine whether the vehicle speed is "0" or not from the signal obtained from the vehicle speed sensor 47. If the vehicle speed is "0" (S13), the arithmetically computed load data is written into, for example, an address t, that is, the address t (for example, 0 address) of the cycle buffer 54 corresponding to a value t (for example, 0 second) of the cycle timer 53. (S14)

Then, the above-described steps are repeated, and the load data in the address corresponding to the address of t seconds are stored, while the cycle of [0→1→2→ . . . 9→10→0→1→ . . . ], is repeated successively.

When the vehicle has entered into the starting condition and the vehicle speed obtained from the vehicle speed sensor 47 is no longer "0", in other words, when the vehicle has started running, the timer value t of the cycle timer 53 at that time of starting the vehicle is confirmed (S17), and the load data stored in the address 10 seconds before the timer value t, is taken out, so as to hold such data in the load memory 52B as the load data at the time of starting the vehicle. (S18)

There is no specific meaning or significance in setting the time for taking out the load data to be 10 seconds before starting of the vehicle. This is simply because the starter action of the vehicle is judged to be made in somewhat about 10 seconds. There will be no problem if it is set to five (5) seconds before starting of the of vehicle.

While the vehicle is running, the load applied to front and rear axles fluctuates according to various different conditions of acceleration, deceleration and road conditions, and such various driving data based on the driving condition display routine is displayed in the display device, while the load data being held is only stored in the load memory 52B, but not displayed. (S19).

The above-described routine (S20) may be used also at the time of stopping the vehicle. However, according to the present invention, the steps as shown in FIG. 3 are taken at the time of stopping the vehicle, specifically.

Figure 3:
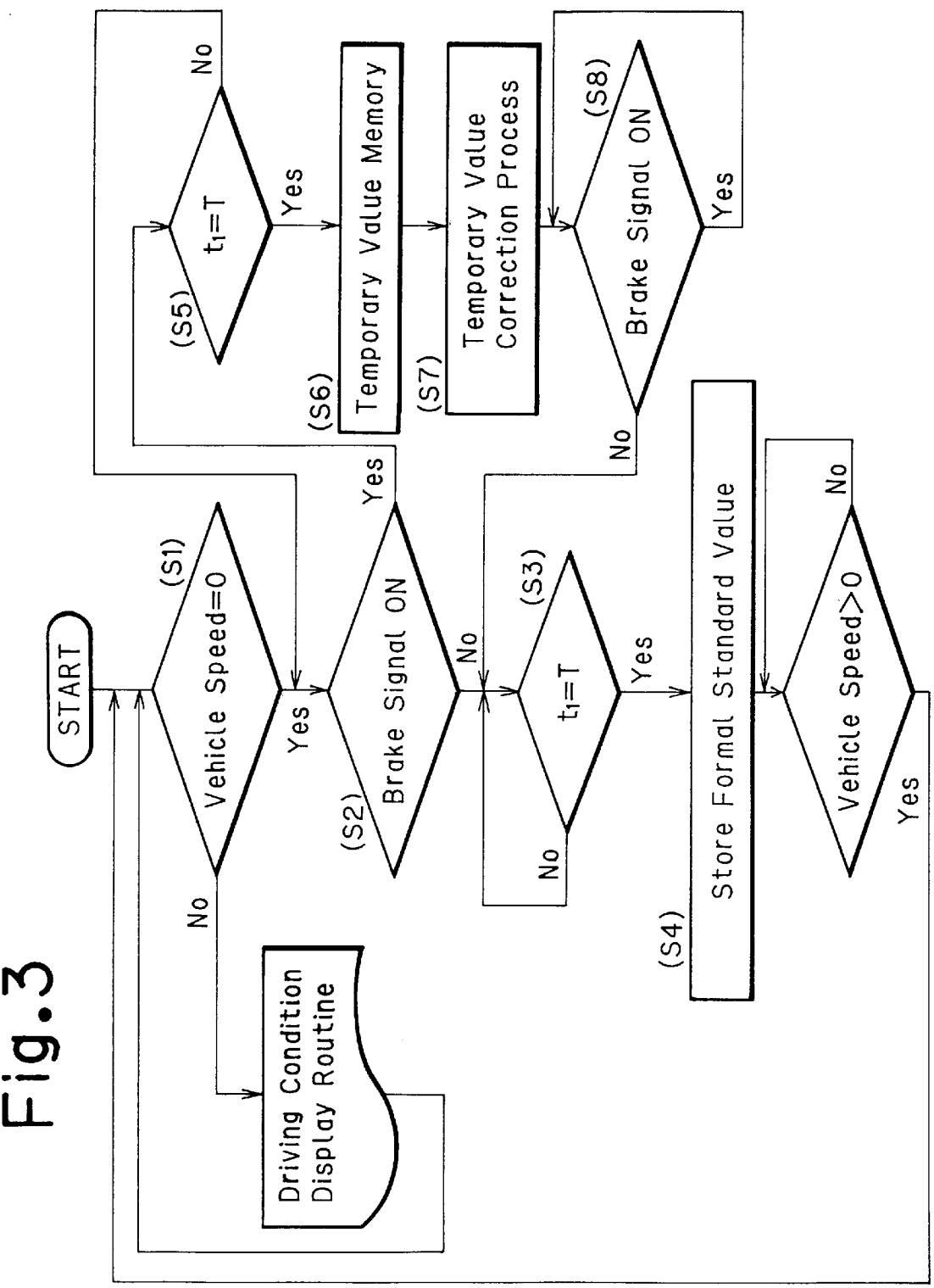
FIG. 3 is a flow chart showing an order of steps taken at the time of stopping the vehicle.
Figure 5:
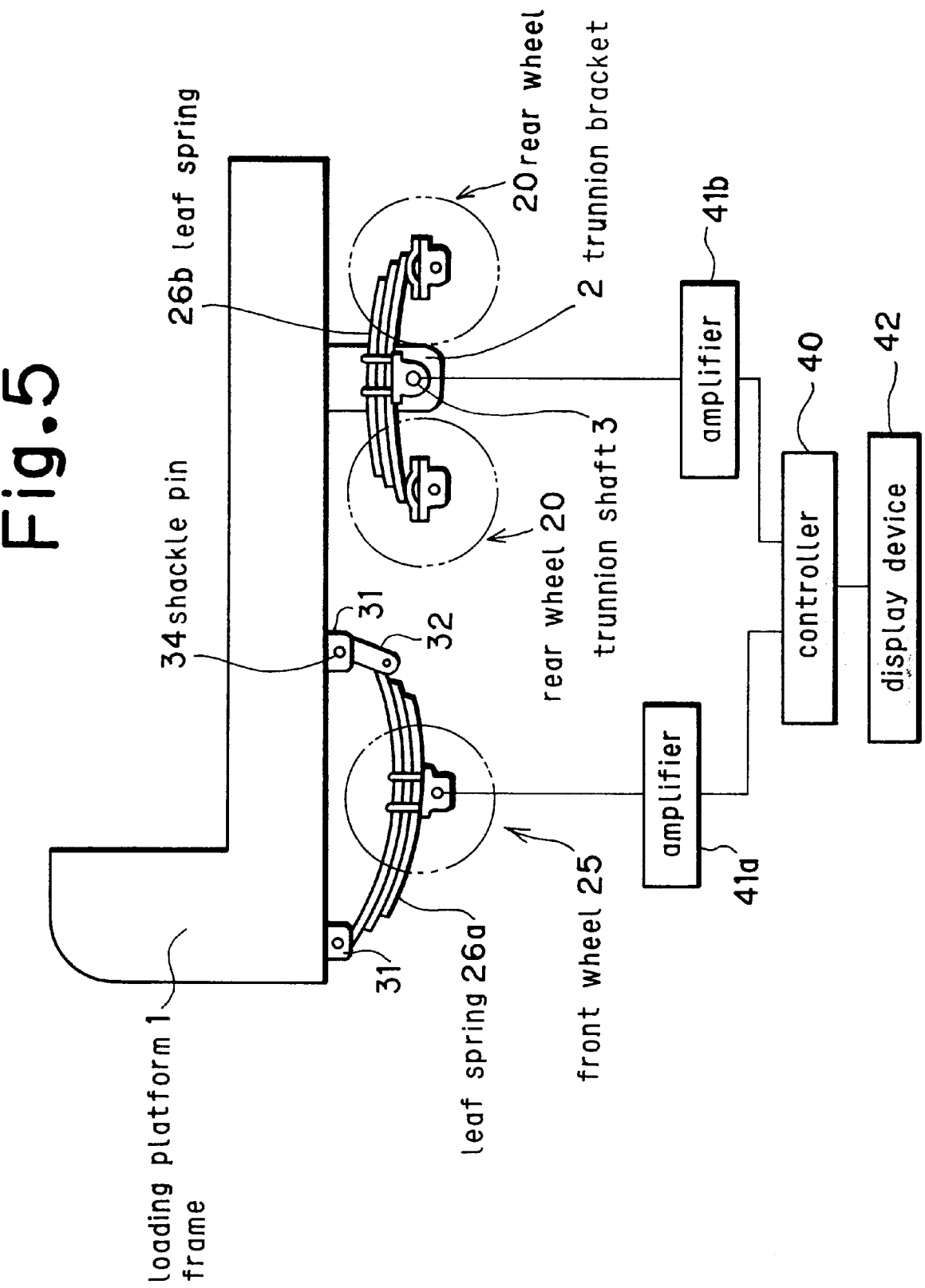
FIG. 5 is a structural view of an apparatus for measuring the vehicle load in a large vehicle to which the present invention is applied.

FIG. 3 is a flow chart showing the order of steps to be taken at the time of stopping the vehicle. First, it is determined whether or not the vehicle speed is "0" and the vehicle has been stopped based on the vehicle speed signal, and if the vehicle is still in the running state, the above-described driving condition display routine is continued. (S1)

When the vehicle speed becomes "0", the brake signal detection switch 46 is checked (S2), and when this switch 46 is still ON, the timer is turned-ON first, and wait for a period of T (e.g., duration of 10 seconds) (S5). After the lapse of this predetermined period of time, the sensor outputs are read from the load sensors, the load data of the loadage and the total weight of the vehicle are arithmetically computed by a predetermined arithmetic computation, and the computed load data is stored in the load memory 52B as a temporary value. (S6)

An amount of error produced while the brake is kept applied after the delay of the time T can be grasped as an empirical value to some extent, and, therefore, a corrected value is arithmetically computed by adding such amount of error to the temporary value according to the pre-stored arithmetic computation routine, and the resulted corrected value is stored in the memory means. (S7)

When the braking action is terminated (S8), the sensor outputs are read from the load sensors 7a, 7b after waiting for the time T(e.g. duration of 10 seconds), the load data of the loadage and the total weight of the vehicle are arithmetically computed by the predetermined arithmetic computation, and the corrected value or the temporary value is substituted by the obtained load data and stored in the load memory 52B as the formal standard value. (S4)

Setting of the waiting time T to 10 seconds is due to the fact that the time for converging aftershocks caused by releasing of the braking action is approximately 10 seconds.

As described above, according to the present invention, the problems of the art of prior applications are solved, and the error caused by the above-described accelerating force at the time of starting the vehicle or by the inertial force at the time of stopping the vehicle is eliminated, so that an accurate and stable load data of the loadage and the total weight of the vehicle can be always stored or displayed.

What is claimed is:

1. A vehicle load measuring apparatus, comprising:
   a load sensor attached to a vehicle member, which receives a weight of a vehicle and outputting signal indicative of the weight,
   load information control means including a load information computing section for arithmetically computing load information of the vehicle based on said signal output from the load sensor, and a load information memory section for storing said load information which has been arithmetically computed in the load information computing section, thereby the stored load information is outputted by the load information control means; and
   vehicle posture information detection means for detecting a posture information of the vehicle, said vehicle posture information means including a vehicle speed sensor for detecting vehicle speed and a brake signal detection unit for detecting whether a brake is being applied,
   wherein, said load information control means up-dates data in the load information memory section when a signal from said vehicle speed sensor in the vehicle posture information detection means indicates a predetermined state of the vehicle.

2. A vehicle load measuring apparatus of claim 1, wherein said load information control means includes a buffer memory section for arithmetically computing the load information in said load information computing section at every first predetermined time, and a predetermined number of the load information is stored in said buffer memory temporarily, and
   wherein said load information control means determines whether the vehicle is in the stopped condition or in the starting condition based on the signal detected by said vehicle speed detection means, and when it is determined that the vehicle is in the starting condition subsequent to the stopped condition, the load information stored in said buffer memory section, a second predetermined time prior to the detection of the starting condition is used for up-dating the data in said load information memory section.

3. A vehicle load measuring apparatus of claim 1, further comprising:
   display means for displaying the load information outputted from said load information control means.

4. A vehicle load measuring apparatus of claim 1 further comprising:
   display means for displaying the load information outputted from said load information control means and
   wherein said load information control means up-dates the display on said display means when the data in said load information memory section is up-dated.

5. A vehicle load measuring apparatus, comprising:
   a load sensor attached to a vehicle member, which receives a weight of a vehicle and outputting signal indicative of the weight,
   load information control means including a load information computing section for arithmetically computing load information of the vehicle based on said signal output from the load sensor, and a load information memory section for storing said load information which has been arithmetically computed in the load information computing section, thereby the stored load information is outputted by the load information control means; and
   vehicle posture information detection means for detecting a posture information of the vehicle, said vehicle posture information means including a vehicle speed sensor for detecting vehicle speed,
   wherein, said load information control means up-dates data in the load information memory section when a signal from said vehicle speed sensor in the vehicle posture information detection means indicates a predetermined state of the vehicle, and
   wherein said vehicle posture information detection means includes braking action detection means for detecting a braking action, and
   said load information control means determines whether the vehicle is in the stopped condition based on a signal detected by said vehicle speed detection means and determines whether the brake is still in the applied condition based on a signal detected by said braking action detection means, and
   when it is determined that the vehicle is in the stopped condition and the brake is not in the applied condition, the load information control means up-dates the data in said load information memory section based on the load information which has been arithmetically computed in said load information computing section.

6. A vehicle load measuring apparatus of claim 5, wherein said load information control means operates such that, when it is determined that the vehicle is in the stopped condition, but the brake is still in the applied condition, the braking action is checked again after a lapse of a predetermined period of time, and when the brake is determined to be no longer in the applied condition, the data in said load information memory section is up-dated based on the load information which has been arithmetically computed in said load information computing section.

7. A vehicle load measuring apparatus of claim 5, wherein said load information control means includes a temporary memory section for temporarily storing the load information which has been arithmetically computed in the load information computing section, and
   when it is determined that the vehicle is in the stopped condition, but the brake is still in the applied condition, the load information which is arithmetically computed in said load information computing section at that point is stored in said temporary memory section.

8. A vehicle load measuring apparatus of claim 5, wherein said load information control means operates such that, when it is determined that the vehicle is in the stopped condition but the brake is still in the applied condition, the load information stored in said temporary memory section is arithmetically compensated to be a corrected load information, and the data in said load information memory section is up-dated based on the corrected load information.

9. A vehicle load measuring apparatus of claim 3, wherein said load information memory section is used also as said temporary memory section.

10. A method of measuring a load carried by a vehicle, comprising:
    detecting a signal indicative of a weight of the load received by at least one vehicle member,
    calculating load information based on said detected signal;
    storing said calculated load information;
    detecting a posture of the vehicle including vehicle speed and operation of a brake; and
    up-dating said stored load information when said detected posture indicates a predetermined state of the vehicle.

11. The method of claim 10, wherein said calculating step is executed every first predetermined time, and said storing step temporarily stores a predetermined number of the load information and said calculating step determines whether the vehicle is in the stopped condition or in the starting condition based on the detected vehicle speed, and when it is determined that the vehicle is in the starting condition subsequent to the stopped condition, the up-dating step uses data obtained a second predetermined time prior to the detection of the starting condition for up-dating the load information data.

12. The method of claim 10, further comprising:

displaying said stored load information.

13. The method of claim 10, further comprising:

displaying said stored load information, wherein said displaying step displays said up-dated stored load information when the stored load information is up-dated.

14. A method of measuring a load carried by a vehicle, comprising:

detecting a signal indicative of a weight of the load received by at least one vehicle member;

calculating load information based on said detected signal;

storing said calculated load information;

detecting a posture of the vehicle including vehicle speed;

up-dating said stored load information when said detected posture indicates a predetermined state of the vehicle, wherein said posture detecting step includes detecting a braking action, and said load information calculating step includes determining whether the vehicle is in the stopped condition based on said detected vehicle speed and determining whether a brake is still in the applied condition based on said detected braking action, and when it is determined that the vehicle is in the stopped condition and the brake is not in the applied condition, said up-dating step up-dates said stored load information based on the calculated load information.

15. The method of claim 14, wherein said calculating step calculates said load information such that, when it is determined that the vehicle is in the stopped condition, but the brake is still in the applied condition, the braking action is checked again after a lapse of a predetermined period of time, and when the brake is determined to be no longer in the applied condition, said up-dating step up-dates said stored load information based on the calculated load information.

16. The method of claim 14, further comprising:

temporarily storing the calculated load information at a point when it is determined that the vehicle is in the stopped condition, but the brake is still in the applied condition.

17. The method of claim 16, further comprising:

compensating said temporarily stored load information to a corrected load information, wherein said up-dating step up-dates the load information based on the corrected load information.

* * * * *